April 11, 1950

J. A. BENDER ET AL 2,503,431

COLLAPSIBLE MANDREL

Filed Nov. 30, 1946

Inventor
Joseph A. Bender
James N. McKiernan
Godfrey D. [Speir]
Attorney

April 11, 1950   J. A. BENDER ET AL   2,503,431
COLLAPSIBLE MANDREL
Filed Nov. 30, 1946   2 Sheets-Sheet 2
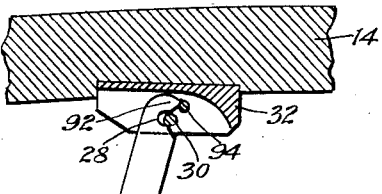
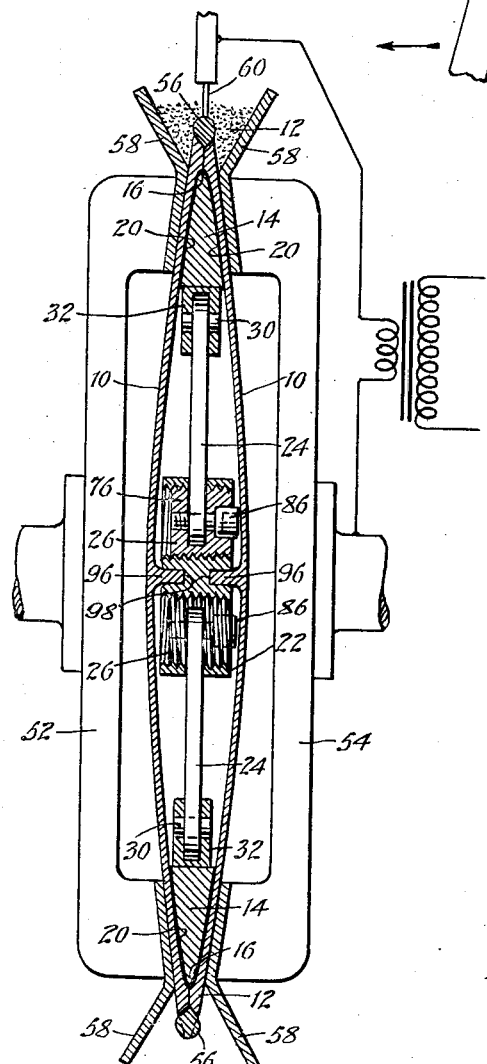
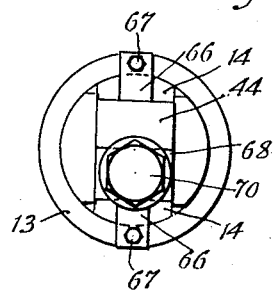
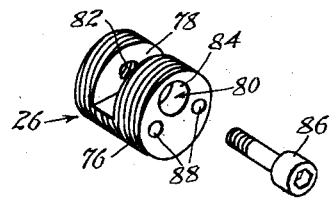
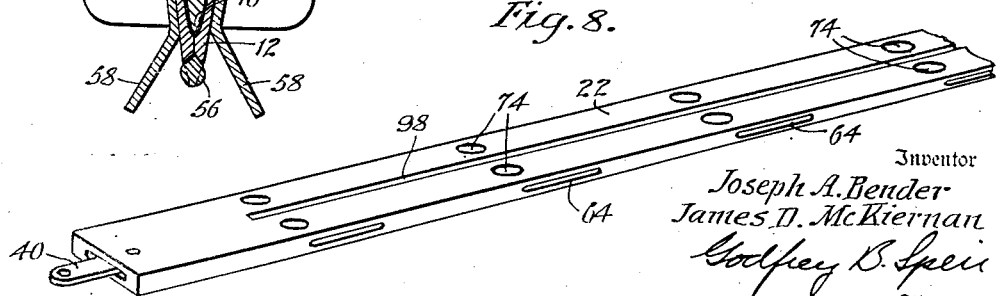
Inventor
Joseph A. Bender
James D. McKiernan
Godfrey B. Speir
Attorney Patented Apr. 11, 1950

2,503,431

UNITED STATES PATENT OFFICE 2,503,431

COLLAPSIBLE MANDREL

Joseph A. Bender, Newark, N. J., and James D. McKiernan, Brooklyn, N. Y., assignors to Curtiss-Wright Corporation, a corporation of Delaware Application November 30, 1946, Serial No. 713,330

11 Claims. (Cl. 113—111)

The present invention relates essentially to special tool equipment utilized in the fabrication of hollow metal propeller blades for aircraft. It relates further to collapsible mandrels which may be inserted within hollow bodies being processed, the mandrel being removable from the body when it is no longer required, the mandrel being so constructed so that it may be reused in subsequent hollow bodies.

In the manufacture of certain types of hollow steel propeller blades, a pair of substantially similar concavo-convex blade blanks or plates are preformed, which are superimposed upon one another, the blanks being in contact at their edges, whereupon the blade blanks are welded around their edges to form a rudimentary propeller blade. One welding process used in joining the blade blanks is known as submerged arc welding, which joins the blade edges by fusion of blade metal and by additional deposited weld metal. Sufficient metal is added so that leading and trailing edges may be formed. One of the features of this mode of fabricating propeller blades includes the fusion of some of the blade material and weld metal to form a rounded fillet within the hollow of the blade adjacent the leading and trailing edges, obviating the need for deposition of copper fillets or of forming other fillets within the blade after the weld operations have been completed. A fillet of some sort at the blade edges is essential to avoid points of stress concentration during blade operation. Without adequate and smooth fillets, blade fractures almost inevitably result.

In practicing the submerged arc welding technique above mentioned, it has been found that shaped mandrels of copper or the like which have sufficient heat conductivity to prevent melting, may be disposed between the blade blank halves prior to welding, said shaped mandrels being covered on their exterior surfaces with a woven glass tape. The mandrel and tape prevent burning through of the plates. They conform closely to the interior surface contour of the blade throughout its length, and define at the interior edges of the plate substantially the proper cross-sectional profile for the fused metal fillet which will be subsequently formed. The mandrel and tape define the fillet cavity and its form, and the fillet when formed, will have a smooth surface caused, it is believed, by capillary action. The glass tape and mandrel form both a mold and a barrier within the blade beyond which the molten metal may not flow. In actual practice, the glass tape (which must be free from volatiles) fuses upon the application of welding heat and forms a slag coating between the copper mandrel and the weld metal to prevent adherence of the copper and weld metal. The glass tape is renewed for each blade application.

Prior to initiation of the welding process, the copper mandrels must be carefully adjusted in their position with respect to the blade edges, and these mandrels are firmly clamped between the blade plates during welding. Upon completion of welding, the copper mandrels must be withdrawn.

It is an object of this invention to provide a mandrel arrangement suitable for the process above described, wherein the mandrels may be applied prior to blade processing and may be readily withdrawn after blade processing. It is a further object of the invention to provide means for adjusting the position of mandrels within the workpiece when they are installed in order that the positioning of the mandrels will be precisely as desired during subsequent work on the article being manufactured. In connection with the use of highly conductive mandrels as mentioned above, they are, upon removal from a completed article, sometimes warped and distorted. If deformed they must be reformed prior to use in a subsequent article. Accordingly, in addition to reforming the mandrels, they must be adjustable within a new set of workpieces so that they may be precisely located to allow for the ultimate formation of perfect blades or other articles.

It is a further object of the invention to provide a multi-part internal mandrel for hollow articles wherein edge portions engage the workpiece, wherein another portion supports the edge portions of the mandrels, and wherein relative adjustment of short increments of the edge mandrel portions with respect to the supporting mandrel portion may be accomplished throughout the length of the mandrel assembly. It is another object of the invention to provide a locating means for a supporting mandrel portion, and thus for bordering mandrel portions.

Other objects of the invention will be apparent as the description proceeds which may be read in connection with the drawings. The description and drawings, however, are exemplary merely of one mode of practicing the invention and are not to be construed as limiting the scope of the invention except as such limitations may be implied by the annexed claims.

In the drawings, in which similar reference characters designate similar parts, Fig. 1 is a plan of a propeller blade workpiece, prior to weld processing, showing the mandrel of this invention in assembled relation;

Fig. 4 is an enlarged longitudinal fragmentary section through one portion of the mandrel assembly;

Fig. 5 is a transverse section through a pair of propeller blade blanks or plates showing the mandrel of this invention in assembled relation, and showing in rudimentary form, the means by which the blade is held in assembled relation during welding;

Fig. 6 is a butt-end elevation of a propeller blade, as it would appear in Fig. 1, with the mandrel of this invention installed;

Fig. 7 is an enlarged perspective elevation of one of the components of the mandrel assembly; and Fig. 8 is a perspective elevation of the support portion of the mandrel.

Figures 1, 2, 3:
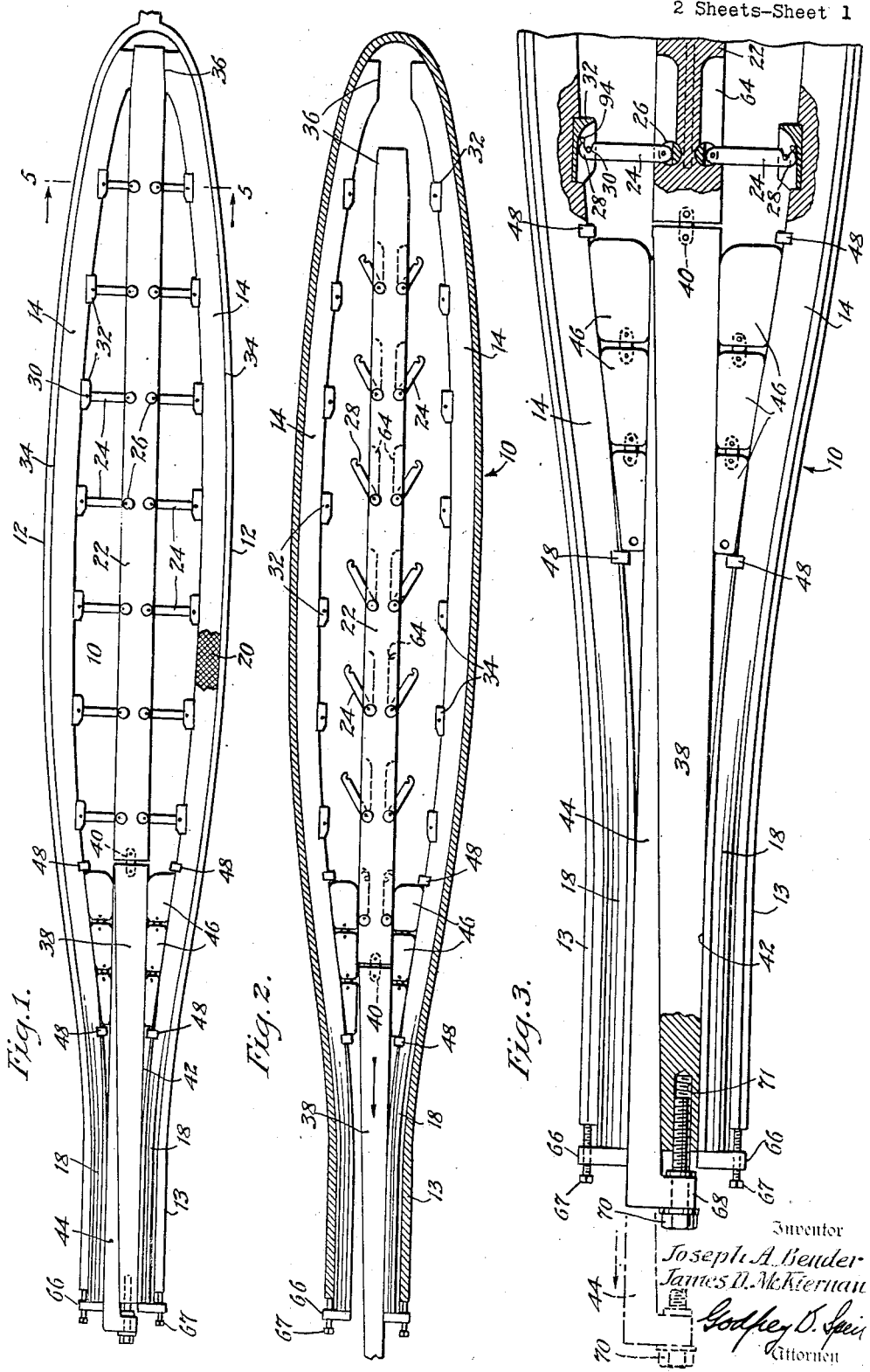
Fig. 2 is a section through a processed propeller blade showing the initial stage of withdrawing the mandrel from the blade interior.
Fig. 3 is an enlarged fragmentary plan of a propeller blade workpiece with the mandrel of this invention installed.

Referring first to Figs. 1 and 5, the blade and mandrel assembly are shown in assembled relation and preparatory to welding processing. The propeller blade is formed of two substantially similar concavo-convex plates 10 disposed in facing relation and abutting or substantially abutting at their leading and trailing edges as at 12. Both blade plates have an oval blade portion sectional form and planform, one end of the ovals blending into a substantially cylindrical shank portion 13 which serves, in the final propeller blade, to secure the blade in a propeller hub.

In readying the blade for the welding process, one of the blade plates 10 is laid flat upon an appropriate support and copper mandrels 14, shaped to the inner form of the blade edges, are laid upon the concave side of the plate adjacent said edges. Each mandrel has a rounded edge 16 fitting within the edges on the concave sides of the blade plates, said copper mandrels through the plate portion having substantially triangular or wedge-like cross section as shown in Fig. 5. The shank ends of the copper mandrels 14 are shaped as at 18 to conform to the cylindrical portions of the blade, and to lie substantially adjacent the inner surfaces of the blade plates when the two halves are laid upon one another. Preparatory to laying in the copper mandrels 14, their surfaces are covered with a glass fabric tape as indicated at 20, the tape forming an insulating refractory layer between the copper mandrels and the steel of the blade plate.

A mandrel spine 22 is now laid between the mandrels 14 and upon the blade plate 10, said spine having a plurality of toggle arms 24 pivoted thereto as at 26. The pivot connections 26 are adjustable, as will shortly be described. Each toggle arm at its outer end is provided with a hook 28 (Figs. 2 and 4) engageable with a pin 30 secured in a fitting 32 brazed or otherwise secured to the inner edge of the mandrel 14.

When the spine 22 is laid in the blade, the hooks in the outer ends of the several arms 24 are engaged with the pins 30 in the fittings 32 of the copper mandrels 14 and each adjustable pivot 26 is manipulated in such fashion that the outer edge 34 of each mandrel will be accurately spaced a prescribed distance from the extreme edges 12 of the blade plate 10. The arms lie substantially normal to the spine, and retain that position while the members 14 and 22 are not displaced lengthwise from one another.

The outer end of the spine 22 engages the outer end portions of the copper mandrels 14 by direct sliding contact, the respective members being tapered as shown at 36 if desired. At the inner end of the spine 22, a tapered bar 38 is articulately linked as at 40, the bar 38 extending through the blade shank, and one side of the bar as at 42 engaging one of the mandrel shank portions 18 to hold it in position against the shank portion of the blade blank. A wedge bar 44 is installed between the other edge of the bar 38 and the other copper mandrel shank portion 18, the wedge 44 being moved from its butt end towards the blade proper to expand the mandrel shanks 18 laterally into engagement with the blade blanks. The shank portion of each blade plate as previously inferred, is semi-cylindrical and coacts with the semi-cylindrical portion of the other blade plate forming a cylindrical shank entirety. The copper mandrel portions 18 lie beneath the parting between the two blade plate shanks when they are assembled. In the transition portion of the propeller blade, between the shank and the blade proper, there may be a substantial distance where the mandrels are unsupported by toggle arms 24 or by the wedge bars 44 and 38. One mode of taking care of this situation is to reinforce the copper mandrels 14 in this region, or alternatively, to back them up by a string of articulated wedge blocks 46 disposed between the copper mandrels 14 and the wedge bars 38 and 44. These wedge blocks 46 are carefully sized and shaped so that they will need no adjustment independently of that afforded by the wedging of the wedge bar 44 with the wedge bar 38. To afford proper longitudinal location of the wedge blocks 46, abutments 48 are secured to copper mandrels 14 in spaced relation. These abutments 48 have an additional function as will shortly be described in conjunction with disassembly of the mandrel from the propeller blade.

After the complete mandrel assembly is laid up on the concave side of one propeller blade plate, the other blade plate is superimposed thereon and the entire assembly is clamped between vice members 52 and 54 shown in Fig. 5. Preferably, there are a plurality of contiguous vice assemblies used on one propeller blade, each assembly covering a portion of the blade length. This enables individual adjustment of the several vice assemblies to attain uniform contact or spacing of the blade plate edges in the region 56 throughout the blade length. When clamped in the vices, the mandrels 14 are prevented from inward movement by the arms 24 and the spine 22. Between the jaws of the vice members 52 and 54 and the blade plates, copper filler plates 58 are disposed, these plates providing deformable conductive gaskets to allow good electrical contact with the blade plates for subsequent electric welding operations. These plates 58 are extended beyond the blade edges to provide a sort of funnel into which a granular, powdered or flaked fluxing material may be placed for blade edge welding.

Upon completion of assembly of the blade components in the vices 52 and 54, the blade halves are ready for welding. An energized welding electrode 60 is passed along the blade edges, the welding circuit being completed through the vice members as indicated in Fig. 5 to accomplish the edge welding of the plates 10.

Upon completion of welding the blade plates to one another along both edges, the wedge bar 44 is withdrawn from the blade as shown in Figs. 3 and 2. Thereupon, an appropriate grapple is engaged with the wedge bar 38 and this, with the spine 22 and the toggle arms 24 are withdrawn from the hollow blade structure through the shank end of the blade. The withdrawing operation is shown in Fig. 2 and it will be noted that the toggle arms 24 disengage their pins 30 and fold into suitable recesses 64 formed in the sides of the spine 22. Upon withdrawal of the wedge bar 44, the wedge blocks 46 are given some lateral freedom so that, when the spine assembly is withdrawn from the blade shank, the lowermost wedge blocks 46 may engage the lowermost mandrel abutments 48 so that the entire spine assembly may be withdrawn without binding, through the wedge blocks while they are still in place. The folding of the toggle arms 24 into their recesses 64 further enables the spine to be withdrawn through the wedge blocks 46.

After removal of the spine 22 from the blade, the wedge blocks 46 may be withdrawn after which each mandrel 14 is loosened from the blade leading and trailing edges and is withdrawn through the blade shank.

It will be appreciated that the various mandrel components capable of disassembly within the blade are essential for use in a propeller blade of the character shown, since the blade portion hollow is considerably wider than the opening of the blade shank. Also, the blade portion hollow is much thinner than the opening of the blade shank. It is essential that a multi-part mandrel be utilized in order that its parts may be withdrawn from the blade individually, through the shank, after the blade halves are securely welded to one another.

After withdrawal of all of the mandrel components from the blade, the copper mandrel elements 14 may be cleaned and provided with new layers of glass tape and the mandrel may be reassembled and used in another subsequent blade to be welded.

As shown in Figs. 3 and 6, the butt end of each mandrel 14 includes a flange 66 extending outwardly therefrom. A screw 67 is engaged in each flange to bear upon the bottom of the propeller blade blank. This enables proper axial location of the copper mandrels in the blade to compensate for differences in length of different blade blanks and differences in the configuration of blade form. Also the wedge bar 44 is provided with an upset end 68 through which a bolt 70 passes to engage a threaded hole 71 in the base of the taper bar 38 in order that the two wedge bars may be held in wedged relation with respect to one another and in order that the wedging action may be overcome when disassembly of the mandrel is to be accomplished.

Referring to Figs. 3, 4, 7 and 8, details of the spine, toggle arms, toggle arm pivots and toggle arm hooks are shown. As to the adjustable pivots 26, the spine 22 is provided with a plurality of fairly large threaded openings 74 within which threaded bushings 76 are screwed. Each bushing is slotted across its center as at 78 to receive the pivot end of the toggle arm 24. The bushing further is provided with an eccentric bore 80, said bore being threaded at one end 82 and being counterbored at the other end 84 to receive an Allen head cap screw 86 which forms a pivot engaging the hole in the inner end of the toggle arm 24. Each arm is disposed in the slot 78 of its bushing 76 and passes through the side of the spine 22 through the recess 64. The counterbored face of the bushing 76 is provided with holes 88 to receive a spanner wrench by which the bushings may be turned in the spine 22.

When the toggle arms are assembled to the copper mandrels 14 as shown in Figs. 1 and 5 by hooking the hooks 28 to the pins 30, lateral adjustment of the toggle arms is accomplished by turning the bushings 76 in their holes; by the eccentric pivoting of the toggle arms, appropriate lateral adjustment is secured. The cap screw 86 is firmly tightened after proper adjustment has been obtained which pinches the two ends of the bushing together (in virtue of the slot 78 between said ends) binding the threads of the bushing against the threads of the hole in the spine 22 to prevent turning of the bushing.

The hook ends 28 of the arms 24 are formed with parallel hook sides so that when they are engaged with the pins 30 secured to the copper mandrels, the arms 24 upon adjustment of the pivots 26 may either push the mandrels 14 outwardly or pull them inwardly without disengagement of the arms and hold them in adjusted position. When the spine 22 is withdrawn axially from the propeller blade, a projection 92 on the outermost end of the arm 24 engages an abutment 94 formed in the fitting 32, the arm then camming against the abutment 94 to disengage the hook 28 from the pin 30 as the arm 24 is tilted from a position perpendicular to the spine 22. Thus, disengagement of all of the hooks is afforded from the mandrels 14 as the spine 22 is withdrawn from the propeller blade and the arms 24 may fold inwardly, into the recesses 64, as the spine is withdrawn.

In some types of propeller blades, partial longitudinal ribs are formed in the blade plates, such ribs being indicated at 96 in Fig. 5. These ribs primarily provide extra strength for the final propeller blade, and also serve as a locating means for the mandrel spine 22, the latter being grooved as at 98 to engage the ribs 96. The ribs then provide positive lateral location of the spine 22 but allow withdrawal of the spine without interference.

If the propeller blade with which the mandrel assembly is to be used is not provided with ribs such as 96, the wedge bar 38 and the spine 22 may be rigidly secured to one another as a unit, and the end of the spine 22 may project through the tip of the rudimentary propeller blade to provide positive lateral location of the mandrel assembly. In such an arrangement, the welding of the blades does not extend around the blade tip which enables mandrel withdrawal, the blade tips being welded closed in a subsequent operation.

The foregoing description of the collapsible mandrel of this invention has been mentioned particularly with respect to welded steel propeller blade fabrication. However, the teachings of the invention are not limited to this utilization of the mandrel nor is the particular form of the mandrel edge portions significant in the use of the invention. For instance, edge members of the mandrel may be adapted to a hollow body of straight or tapered configuration or of curvature differing from that of the propeller blade shown. Further, edge mandrel portions varying in number from one to a large plurality may be used in conjunction with a support spine, the several edge mandrel members being supported on the spine member by toggle arms capable of disengagement with the edge mandrel components upon withdrawal of the spine from the hollow body. The various details of construction of the mandrel assembly are susceptible of considerable change and modification to suit the assembly for use in different environments.

Though but a single embodiment of the invention has been illustrated and described, it is to be understood that changes may be made without departing from the spirit or scope thereof, as will be apparent to those skilled in the art. Reference should be had to the appended claims for a definition of the limits of the invention.

What is claimed is:

1. A collapsible mandrel for use in a hollow body comprising opposed edge strips adapted to lie against the body interior, a spine between said strips and within the body, a plurality of struts pivoted to said spine for swinging and lateral extension therefrom, and means separably engaging the free ends of said struts with said strips, operable upon retraction of said spine to swing and disengage said struts from said strips, said means comprising hooks and hook engagers on said struts and strips.

2. A multi-part mandrel for temporary use within a hollow body comprising a plurality of mandrel portions engageable with the interior surface of the body, a support member between said portions, a plurality of swingable support arms connecting said support member with said mandrel portions, said arms including elements separably engageable with said mandrel portions and means responsive in its operation to displacement of said member from a mandrel supporting position to swing and disengage said support arm elements from said mandrel portions.

3. A multi-part mandrel for temporary use within a hollow body comprising a plurality of mandrel portions engageable with the interior surface of the body, a support member between said portions, a plurality of swingable support arms connecting said support member with said mandrel portions, said arms including elements separably engageable with said mandrel portions and means responsive in its operation to displacement of said member from a mandrel supporting position to swing and disengage said support arm elements from said mandrel portions, said arms being independently adjustable in effective length to vary the position of said mandrel portions relative to said member when the mandrel parts are assembled.

4. A multi-part mandrel for temporary use within a hollow body comprising a plurality of mandrel portions engageable with the interior surface of the body, a support member between said portions, a plurality of swingable support arms connecting said support member with said mandrel portions, said arms including elements separably engageable with said mandrel portions means responsive in its operation to displacement of said member from a mandrel supporting position to swing and disengage said support arm elements from said mandrel portions, and means adapted to hold said support member in fixed position within said hollow body.

5. A multi-part mandrel for temporary use within a hollow body having an opening for mandrel withdrawal smaller than the body proper, comprising a mandrel portion engageable with the body interior surface and of a size to pass through said opening, a support member within said body of a size to pass through said opening, a plurality of arms swingably and disengageably joining said portion and member to hold them at times in spaced relation within said body, and means to swing and disengage the arm connections between said portion and member while within said body to allow independent removal of each from the body, said means being responsive in its operation to withdrawal of said support member from said body.

6. A multi-part mandrel adapted for use in fabricating a hollow body from hollow half-bodies, comprising a mandrel portion adapted to be disposed in a half-body, a support portion adapted to be disposed in the half-body, a plurality of arms adjustably secured to one said portion, the free ends of said arms, and said other portions, having coacting elements which are separably engageable, said arms being independently adjustable in length when accessible in the half-body to enforce engagement of said mandrel portion throughout part of the half-body interior surface, the other said half-body being adapted for assembly and joinder to the first half-body, and means to secure said support portion in the half-bodies, said securing means being removable after joining of said half-bodies, and said support portion being removable from the joined half-bodies independently of and prior to removal of said mandrel portion by the disengagement of said arms from said other portions.

7. A multi-part mandrel adapted for use in the fabrication of hollow steel propeller blades, the blades comprising plates adapted to be welded along their edges and having a substantially cylindrical shank at one end of less diameter than the width of the blade proper, comprising cuprous strips within the leading and trailing blade edges, a central spine adapted to extend through the blade, a plurality of arms swingably pivoted to said spine provided with elements separably engageable with parts of said cuprous strips, and means to position said spine laterally and longitudinally within the blade to hold said strips, through said arms, adjacent the blade interior surfaces, said spine being removable from said blade through said shank after welding, independently of said strips, accompanied by the swinging and disengagement of said arm elements from said strips.

8. A multi-part mandrel adapted for use in the fabrication of hollow steel propeller blades, the blades comprising plates adapted to be welded along their edges and having a substantially cylindrical shank at one end of less diameter than the width of the blade proper, comprising cuprous glass tape covered strips within the leading and trailing blade edges, a central spine adapted to extend through the blade, a plurality of arms swingably pivoted to said spine separably engageable with said cuprous strips, and means to position said spine laterally and longitudinally within the blade to hold said strips, through said arms, adjacent the blade interior surfaces, said spine being removable from said blade through said shank after welding independently of said strips, by the swinging and disengagement of said arms from said strips, said strips having means to disengage said arms therefrom after initiation of spine withdrawal and to swing said arms for withdrawal with said spine through said shank.

9. A multi-part mandrel adapted for use in the fabrication of hollow steel propeller blades wherein the blades comprise plates adapted to be welded along their edges and having a substantially cylindrical shank at one end of less diameter than the width of the blade proper, comprising cuprous strips, a central spine extending between the strips, a plurality of arms pivoted to said spine and having hooking engagement with said cuprous strips, and means to position said spine laterally and longitudinally within the blade to hold said strips, through said arms, adjacent the blade interior surfaces, said spine being removable from said blade through said shank, independently of said strips, by the unhooking of said arms from said strips, said strips having means to unhook said arms therefrom after angular movement of said arms due to initiation of spine withdrawal from said blade.

10. A multi-part mandrel adapted for use in the fabrication of hollow steel propeller blades wherein the blades comprise plates adapted to be welded along their edges and having a substantially cylindrical shank at one end of less diameter than the width of the blade proper, comprising cuprous strips, a central spine extending between the strips, a plurality of arms pivoted to said spine and having hooking engagement with said cuprous strips, and means to position said spine laterally and longitudinally within the blade to hold said strips, through said arms, adjacent the blade interior surfaces, said spine being removable from said blade through said shank, independently of said strips, and by initiation of spine withdrawal unhooking said arms from said strips, the pivots of said arms on said spine being adjustable to alter the distance between said spine and strips.

11. A multi-part mandrel adapted for use in the fabrication of hollow steel propeller blades wherein the blades comprise plates adapted to be welded along their edges and having a substantially cylindrical shank at one end of less diameter than the width of the blade proper, comprising cuprous strips, a central spine extending between the strips, a plurality of arms pivoted to said spine and having hooking engagement with said cuprous strips, and means to position said spine laterally and longitudinally within the blade to hold said strips, through said arms, adjacent the blade interior surfaces, said spine being removable from said blade through said shank, independently of said strips, and by initiation of spine withdrawal unhooking said arms from said strips, said arms being adjustable in effective length between said spine and strips to alter the spacing of said strips from said spine.

JOSEPH A. BENDER.
JAMES D. McKIERNAN.

REFERENCES CITED

The following references are of record in the file of this patent:

UNITED STATES PATENTS

| Number | Name | Date |
|---|---|---|
| 415,544 | Long et al. | Nov. 19, 1889 |
| 844,062 | Varney | Feb. 12, 1907 |
| 2,312,094 | Harmon | Feb. 23, 1943 |